UNITED STATES PATENT OFFICE.

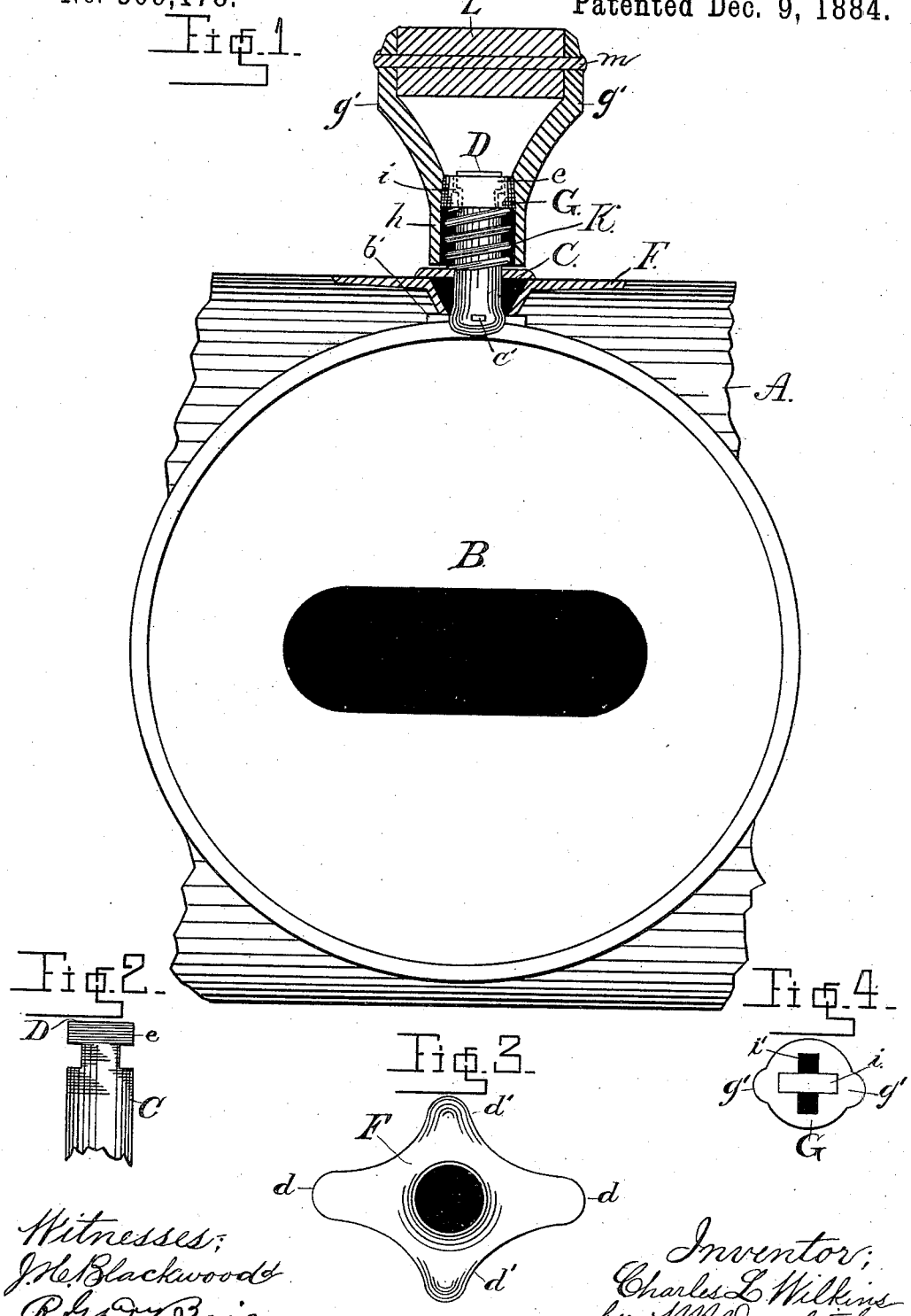

CHARLES L. WILKINS, OF COLUMBUS, OHIO.

DAMPER.

SPECIFICATION forming part of Letters Patent No. 309,178, dated December 9, 1884.

Application filed March 18, 1884. (No model.)

*To all whom it may concern:*

Be it known that I, CHARLES L. WILKINS, a citizen of the United States, residing at Columbus, in the county of Franklin and State of Ohio, have invented certain new and useful Improvements in Dampers; and I do hereby declare the following to be a full, clear, and exact description of the invention, such as will enable others skilled in the art to which it appertains to make and use the same.

My invention relates to that class of dampers for stove and other pipes constructed with a single bearing in one side only of the pipe-section; and it consists in an improvement in the form of several of the parts by which such a damper is held in place and operated. It is illustrated in the accompanying drawings, in which—

Figure 1 is a longitudinal section, and Figs. 2, 3, and 4 detached views of separate parts.

In the drawings, A represents a section of pipe; B, the damper, and C a round shank of the damper cast thereon. At the point where the damper and shank join the damper is provided with shoulders $b'$. The shank C is provided with a collar-bearing, $c'$, back of the shoulders $b'$ on the damper, and at its outer end with a round projection, D, having square lugs $e$.

F is a washer or collar of the form shown in Fig. 3, adapted to ride upon the collar-bearing $c'$ on the shank and abut against the shoulders $b'$ on the damper. It is provided with arms $d\ d\ d'\ d'$, the outer surfaces of which are adapted to fit closely to the pipe, the horizontal arms $d'\ d'$ being curved inward slightly at their outer ends to correspond to the contour of the pipe.

G is an open handle, composed of the arms $g'\ g'$, terminating in a cylindrical portion, $h$, and provided at the top with a round wooden cross-piece, L, secured on rivet or rod $m$, connecting the arms $g'\ g'$. The shank C extends up through this part $h$, which is provided with a slot, $i$, and cross-notches, $i'$, through which the lugs $e$ on the shank are passed.

K is a spiral spring surrounding the shaft C within the cylinder $h$, the function of which spring is to hold the handle rigidly against the lugs $e$.

In putting the parts together the washer is first placed in position against the inner side of the pipe, the shank C then passed through the hole in the pipe, and the spiral spring placed over the shank. The handle G is then put over the shank until lugs $e$ enter the slot $i$, when the handle is locked in position by giving the handle a turn, so that the lugs $e$ will enter the cross-notches $i$ and stand at right angles to the slot.

In operation, the damper may be closed or opened or fixed at any desired position by turning the handle G. When it is desired to remove the handle and separate and take off the parts, the handle G is pressed down upon the spiral spring and turned until the slot $i$ is in line with the lugs $e$, so as to disengage the lugs therefrom.

I am aware of the patent of Natchez, No. 230,805, in which is described and claimed, in combination with a damper and its crank or handle provided with engaging shoulders, a slotted and recessed clamping-plate adapted to be slipped over the bent end of said handle; but I dispense with such a cap-piece and combine in one piece the functions of a handle, a receptacle for the spring, and a clamp.

Having thus described my invention, what I claim, and desire to secure by Letters Patent, is—

1. The stove-pipe damper provided with the shank C and lugs $e$, in combination with the handle G, having the round portion $h$, slot $i$, notches $i'$, and arms $g'$, and the spiral spring K, substantially as described.

2. In a stove-damper, in combination with the T-headed shank, the handle G, provided with the arms $g'$, cross-piece L, and the slotted and notched portion $h$, for the reception of the damper-shank and spiral spring, substantially as described.

In testimony whereof I affix my signature in presence of two witnesses.

CHARLES L. WILKINS.

Witnesses:
 PETER E. FLECK,
 J. H. VERCOE.